(12) United States Patent
Olt

(10) Patent No.: US 8,434,697 B1
(45) Date of Patent: May 7, 2013

(54) AUTONOMOUS SYSTEM FOR INJECTING ADDITIVES INTO IRRIGATION WATER

(76) Inventor: Peter Olt, Clearwater, FL (US)

( * ) Notice: Subject to any disclaimer, the term of this patent is extended or adjusted under 35 U.S.C. 154(b) by 116 days.

(21) Appl. No.: 13/068,469

(22) Filed: May 12, 2011

(51) Int. Cl.
| | |
|---|---|
| B05B 7/30 | (2006.01) |
| B05B 7/26 | (2006.01) |
| F23D 14/60 | (2006.01) |
| A62C 5/02 | (2006.01) |
| A62C 13/62 | (2006.01) |
| A62C 13/66 | (2006.01) |

(52) U.S. Cl.
USPC .............................. 239/310; 239/353; 239/340

(58) Field of Classification Search .................. 239/310, 239/353
See application file for complete search history.

(56) References Cited

U.S. PATENT DOCUMENTS

| | | | | | |
|---|---|---|---|---|---|
| RE29,495 | E | * | 12/1977 | Georgi | 222/1 |
| 4,545,396 | A | * | 10/1985 | Miller et al. | 137/78.3 |
| 4,852,802 | A | * | 8/1989 | Iggulden et al. | 239/64 |
| 4,895,303 | A | * | 1/1990 | Freyvogel | 239/61 |
| 4,917,304 | A | * | 4/1990 | Mazzei et al. | 239/64 |
| 5,022,585 | A | * | 6/1991 | Burgess | 239/70 |
| 5,056,036 | A | * | 10/1991 | Van Bork | 700/282 |
| 5,135,174 | A | * | 8/1992 | Chaplinsky | 239/310 |
| 5,227,068 | A | * | 7/1993 | Runyon | 210/610 |
| 5,366,159 | A | * | 11/1994 | Childers | 239/310 |
| 6,314,979 | B1 | * | 11/2001 | Lips | 137/3 |
| 6,899,282 | B1 | * | 5/2005 | Hill | 239/61 |
| 7,083,118 | B1 | * | 8/2006 | Bowles et al. | 239/310 |
| 7,487,925 | B2 | * | 2/2009 | Skinner | 239/63 |
| 2001/0048037 | A1 | * | 12/2001 | Bell et al. | 239/70 |
| 2006/0108455 | A1 | * | 5/2006 | Thornton | 239/574 |
| 2007/0290072 | A1 | * | 12/2007 | Smith | 239/310 |
| 2011/0015793 | A1 | * | 1/2011 | Crist et al. | 700/284 |
| 2011/0077784 | A1 | * | 3/2011 | Lips | 700/283 |

* cited by examiner

*Primary Examiner* — Len Tran
*Assistant Examiner* — Alexander M Valvis

(57) ABSTRACT

Injection apparatus for automatically applying pest control concentrates and fertilizers into an existing underground irrigation system. Apparatus uses an electronic control system programmed to activate one or more injection pumps and to also operate the zonal flow control solenoids contained in an existing underground or other type of irrigation system. Apparatus includes a single or plurality of storage reservoirs for storing one or more additives with piping to deliver these additives to the existing irrigation system.

6 Claims, 9 Drawing Sheets

AUTONOMOUS SYSTEM FOR INJECTING ADDITIVES INTO IRRIGATION WATER

BACKGROUND OF THE INVENTION

This product has been developed to eliminate mosquitoes and other pests from residential and commercial properties. Most competitors' products attempt to attract mosquitoes and other pests to trap them. This brings additional pests into the area; clearly the principle is flawed.

Based on this, an automatic mosquito control system was built that works with existing irrigation systems and uses them to deliver concentrates that kills mosquitoes and other targeted pests where they reside, in gardens and lawns.

The system can be installed with any new or existing irrigation system and uses advanced electronics to allow the irrigation system to distribute the mosquito concentrate to all lawns and gardens. From a user's perspective it is completely automatic.

There is also an option that allows the system to fertilize lawns and gardens automatically as well as a wireless remote control option.

FIELD OF THE INVENTION

This invention relates to an automatic chemigation system and more particularly relates to irrigation systems autonomously controlled to inject liquid pest control concentrates and fertilizers into irrigation system water.

DESCRIPTION OF THE PRIOR ART

Many patents were thoroughly searched but almost all had no resemblance to the apparatus. The only patents found that interacted with an irrigation system in a similar way to the apparatus were:

U.S. Pat. No. 4,917,304 B "Automatic controller for injection of additives into irrigation water". This apparatus works only when the irrigation timer is ON and gets its signals from it. It does not control the irrigation system at all; "which operates in tandem with and is an adjunct to a basic irrigation timer" is quoted from the patent.

U.S. Pat. No. 5,022,585 B "Automatic Chemigation". This is close but only claims to be used for fertilization. Also, this unit works only when the irrigation timer is ON and gets its signals from it. It does not control the irrigation system at all.

The point of difference that I believe makes the Apparatus "patently distinct" is:

The prior art administers chemigation while the irrigation system is being run by the existing control system (timer) and works in a manner subservient to the irrigation timer. The apparatus in this patent takes control of the irrigation system and runs it by controlling the irrigation zone solenoids and simultaneously running injection pumps.

The apparatus works in conjunction with the existing irrigation system timer. But, it does not use it, or even need it for the apparatus to function. It does not, however, in any way, hinder the operation of the irrigation system timer and is designed to "fail safe". This means it always allows the irrigation system to remain operational in the event that the apparatus fails in any way.

The use of irrigation equipment is known in the prior art. More specifically, irrigation equipment previously devised and utilized for the purpose of chemigation are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe an autonomous system for injecting additives into irrigation water that allows for pest control and fertilizing of plants and lawns.

In this respect, the autonomous system for injecting additives into irrigation water according to the present invention substantially departs from the conventional concepts and designs of the prior art, and in doing so provides an apparatus primarily developed for the purpose of pest control and fertilizing of plants and lawns.

Therefore, it can be appreciated that there exists a continuing need for a new and improved an autonomous system for injecting additives into irrigation water which can be used for pest control and fertilizing of plants and lawns. In this regard, the present invention substantially fulfills this need.

SUMMARY OF THE INVENTION

A typical irrigation system for a lawns and gardens involves an underground irrigation network which sequentially supplies water to zones in which the lawn and gardens are divided. Such an arrangement makes it possible to control accurately the delivery of water.

This apparatus is an injection system for automatically applying pest control concentrates and fertilizers into an existing underground irrigation system. Apparatus uses an electronic control system programmed to activate one or more injection pumps and to also operate the zonal flow control solenoids contained in an existing underground or other type of irrigation system. Apparatus includes a single or plurality of storage reservoirs for storing one or more additives with piping to deliver these additives to the existing irrigation system. Apparatus contains a programmable microprocessor that is programmed to run concentrate application cycles at predetermined times, working autonomously and taking control of the irrigation systems zonal control solenoids. Application times are not thereby reliant on the irrigation systems existing watering schedules. Apparatus does not impede the normal operation of the irrigation system.

Apparatus is either retro fitted to an existing irrigation system or can be fitted at the time the irrigation system is installed.

In a typical irrigation system, an existing irrigation timer connects to the zonal flow control solenoids via an electrical cable. The zonal solenoids are normally housed in an enclosure but can be mounted in any configuration. The water is supplied via a feeder pipe from a water source, and often through a backflow prevention valve. The zonal solenoids then open to supply water to each irrigation zone. These are the components of a typical irrigation system.

The apparatus mounts near the zonal solenoid enclosure, normally to the side of the house. It has an electrical cable which runs to a nearby A/C outdoor outlet and uses a "wall wart" type power supply to supply the apparatus with a safe 24 volts, but apparatus could also run on mains A/C power. An electrical cable connects the apparatus to the existing irrigation wiring and a small diameter pipe(s) connects the pump(s) in the apparatus to the irrigation water supply pipe, downstream of the backflow prevention valve.

In the second embodiment, apparatus serves as both the chemigation timer and also as the irrigation timer, thereby fully controlling all functions.

Operation:

The apparatus has a reservoir and pump that are configured to treat for mosquitoes and other nuisance insects. Additionally, the apparatus can have additional pump/reservoir assemblies that administer fertilizers and/or additional concentrates such as weed killers.

The apparatus has a programmable microprocessor that is set to run application cycles periodically. There is a dial or other switch type through which the user can select the preferred treatment frequency for each type of concentrate. In other words, there is a dial for pest concentrate application and another for fertilizer or any other type of treatment concentrate the apparatus is configured to apply. When the designated time arrives to start an application cycle, the programmable microprocessor goes to the next step.

There can be level sensors in each reservoir that are wired to inputs on the programmable microprocessor. This will cause a scheduled application to be skipped if the sensor indicates that the fluid level is below the usable amount. There can also be an LED for each reservoir that flashes on the control panel to indicate a low fluid level alarm. A buzzer may also be set up to sound in this case. If there are sufficient chemicals the logic goes to the next step.

Logic is present that senses when the irrigation system was last run and from that it calculates if this occurred within a certain number of hours. With this data it knows that the lawns and gardens are wet and so defers the next treatment cycle for a certain period, currently 6 hours, to allow the plants to dry off. Note: If a pest concentrate was to be applied to thoroughly wet plants, much of it would be washed onto the ground and wasted. The apparatus may also be fitted with an external rain sensor to defer treatment cycles after rainfall for a certain period. Note: This deferment logic will not normally apply if the apparatus is initiating a fertilizer application cycle. Then the next step starts.

The application cycle commences; the apparatus will take control of, and activate, the first irrigation zone by energizing the respective zonal solenoid. It does this by way of a relay interposed into the electrical circuit to the zonal solenoid. When this relay is OFF, the irrigation timer controls the zonal solenoid. When the relay is ON, power is supplied to the zonal solenoid from the apparatus turning on the solenoid and activating the respective irrigation zone. Note: A solid state component could be used in place of the described relay. Then the next step starts.

The pest control concentrate will be injected into the stream of irrigation water by very accurately (electronically) modulating the corresponding pump to deliver an exact amount of concentrate into the flow of irrigation water. The zonal solenoid is on during this time and then over-run for a preset period to flush the concentrate through the irrigation lines, ensuring all concentrate is administered to the lawns and gardens, and not left sitting in the irrigation systems' pipes. Then the apparatus turns off the first zonal solenoid and repeats the process sequentially for each zone in the irrigation system. It does this automatically. After cascading through each active zone, the process is complete and the apparatus waits until the next application time arrives. There are user configurable dip switches or movable electrical jumpers to set the number of zones used in the irrigation system.

The apparatus utilizes algorithms in the programmable microprocessor to alter the modulation of the injection pump(s) to facilitate varying sizes of irrigation zones, always ensuring that an exact amount of concentrate is applied proportional to the area that the zone covers. The size for each irrigation zone is user configurable through either a series of dip switches or movable electrical jumpers.

If desired, there is an optional wireless remote that has buttons for each type of concentrate. This allows the operator to press a button and immediately initiate a treatment cycle. This is especially useful, for example, if there was an outdoor function and the operator wanted to be certain that there was a fresh dose of pest control concentrate applied.

In the second embodiment, the apparatus can also serve as the irrigation timer and as such would control both the irrigation system and the concentrate application cycles. This would have additional controls to program the desired irrigation application intervals.

There can also be momentary switches on the control panel to prime the respective pumps and also a switch to immediately initiate a pest treatment cycle. This does not alter the normal scheduling but provides for an additional treatment cycle on demand.

From the above it can be seen that the apparatus can be configured for different sized irrigation systems and different sized zones within an irrigation system. Also, the apparatus can administer a multiple of different concentrates, for different purposes and at different time intervals for each one respectively. A remote control can be used to override schedules and the apparatus may even be configured to act as the irrigation system timer as well as a chemigation application system. It can also be seen that the apparatus is completely autonomous and not reliant on the irrigation system scheduled water cycles to be able to operate chemigation applications.

In view of the foregoing disadvantages inherent in the known types of irrigation equipment now present in the prior art, the present invention provides a new and improved autonomous system for injecting additives into irrigation water. As such, the general purpose of the present invention, which will be described subsequently in greater detail, is to provide a new and improved autonomous system for injecting additives into irrigation water and method which has all the advantages of the prior art and none of the disadvantages.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention.

It is important, therefore, that the claims be regarded as including such equivalent constructions insofar as they do not depart from the spirit and scope of the present invention.

It is therefore an object of the present invention to provide a new and improved autonomous system for injecting additives into irrigation water which has all of the advantages of the prior art irrigation equipment and none of the disadvantages.

It is another object of the present invention to provide a new and improved autonomous system for injecting additives into irrigation water which may be easily and efficiently manufactured and marketed.

It is further object of the present invention to provide a new and improved autonomous system for injecting additives into irrigation water which is of durable and reliable constructions.

An even further object of the present invention is to provide a new and improved autonomous system for injecting additives into irrigation water which is susceptible of a low cost of manufacture with regard to both materials and labor, and which accordingly is then susceptible of low prices of sale to the consuming public, thereby making such an autonomous system for injecting additives into irrigation water economically available to the buying public.

Even still another object of the present invention is to provide an autonomous system for injecting additives into irrigation water for pest control and fertilizing of plants and lawns.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
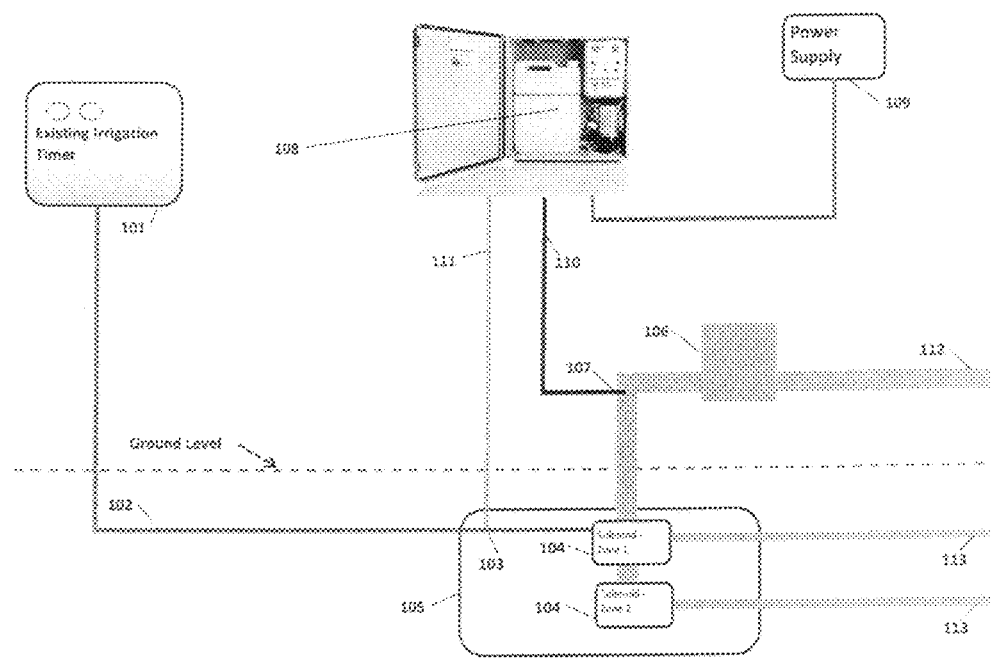
FIG. 1 is a simple illustration showing a typical irrigation system fitted with the apparatus.

Referring to drawing FIG. 1 thereof, the existing irrigation timer (101) connects to the zonal water zonal solenoids (104) via an electrical cable (102). Note: Two solenoids are shown but there may be any number. The zonal solenoids are normally housed in an enclosure (105) but can be mounted in any configuration. The water is supplied via a feeder pipe (112) from a water source, and often through a backflow prevention valve (106). The zonal solenoids (104) then open to supply water to each irrigation zone (113). These are the components of a typical irrigation system.

The apparatus (108) mounts near the zonal solenoid enclosure, normally to the side of the house. It has an electrical cable (109) which run to a nearby A/C outdoor outlet and uses a "wall wart" type power supply to supply the apparatus with a safe 24 volts, but apparatus could also run on mains A/C power. An electrical cable (111) connects the apparatus to the existing irrigation wiring and a small diameter pipe(s) (110) connects the pump(s) in the apparatus to the irrigation water supply pipe (107), downstream of the backflow prevention valve (106).

Figure 2:
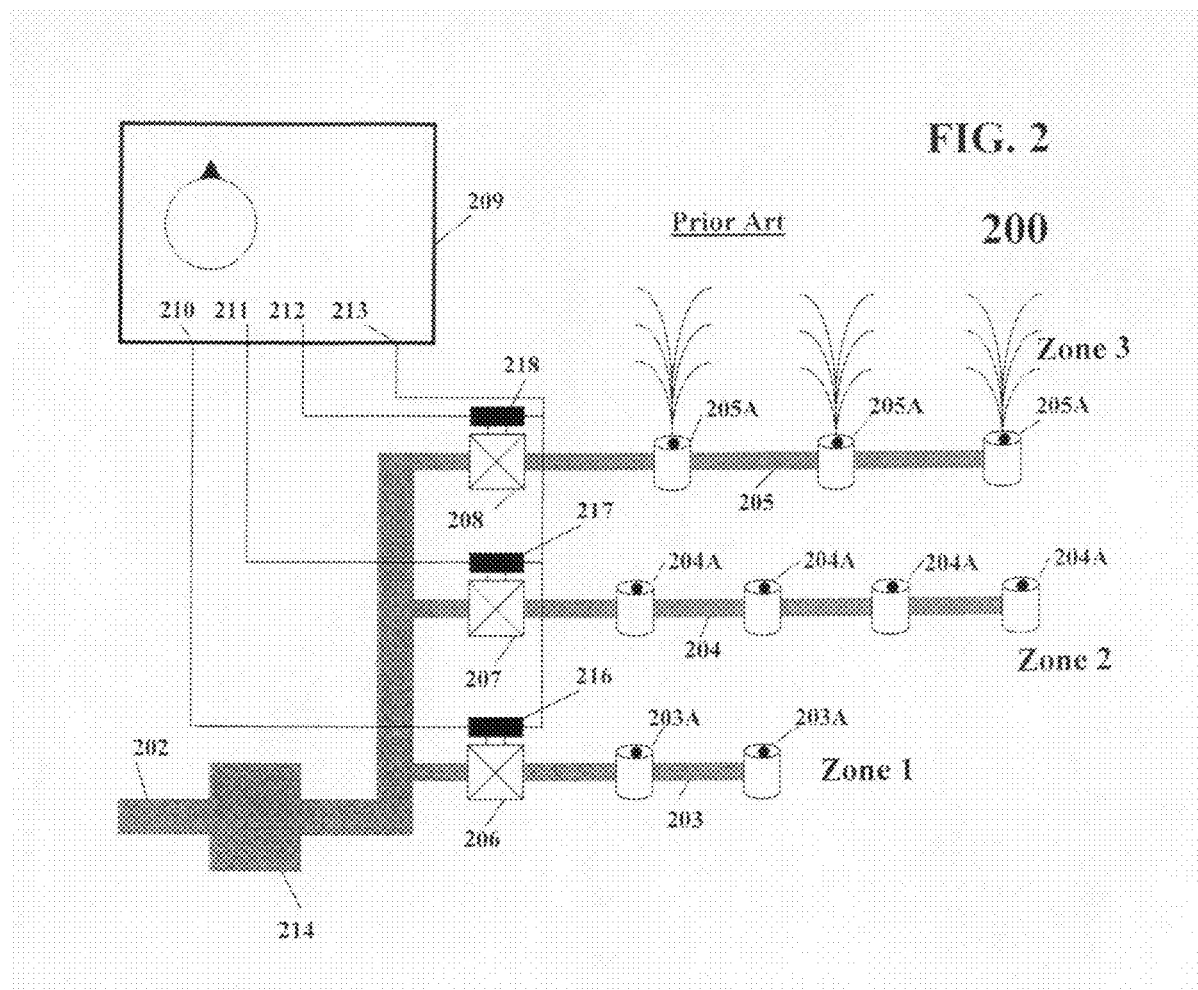
FIG. 2 is a schematic illustration of a conventional three zone lawn irrigation system.

Now with reference to drawing, FIG. 2 thereof, a conventional automatic sprinkling system (200) consisting of a water main (202) that supplies water to zonal supply lines (203), (204), (205) delivering to zones 1, 2, and 3 respectively as is understood in the art. Each of the headers is provided with sprinkler heads (203A), (204A) and (205A), respectively, to deliver the water to the area covered by their respective zones. It is understood that the number and arrangement of the sprinkler heads in each of the zones may vary according to the size, shape and nature of the respective zones.

To control water delivery to the various headers and the sprinkler heads there is provided for each header control valves (206), (207), (208), coupling each zone line to the main water supply line, a solenoid coupled to each valve (216), (217), (218), respectively, which are under the control of an irrigation controller (209), having a timer as part of its mechanism. Irrigation controller (209), is equipped with timers to regulate the opening and closing of each of the solenoid control valves (206), (207), and (208), in sequence through electrical lines (210), (211), (212) respectively and common line (213). With the use of the inbuilt timer, water can be delivered to zone 1 for a particular duration of time, once a day, for example, for distribution by sprinkler heads (203A). Similarly, zone 2 can be programmed to receive water after the water delivery to zone 1 is completed. Again this is followed by zone 3 in sequence using commands from the timer and related logic contained in control unit (209). In this way each zone can receive water in turn for its own specific period of time. A backflow prevention valve (214), may be employed.

Now with reference to drawing, FIG. 3 thereof, the preferred embodiment of the new and improved autonomous system for injecting additives into irrigation water embodying the principles and concepts of the present invention and generally designated by the reference numerals (300) and (400) will be described.

The present invention, an autonomous system for injecting additives into irrigation water (300) and (400) is comprised of a plurality of components. Such components are individually configured and correlated with respect to each other so as to attain the desired objective.

The present invention is a chemical injection apparatus for use with an irrigation assembly of the type having a main line (302), with a plurality of zone lines (303), (304), (305), the zone lines having spray heads (303A), (304A), (305A) respectively, a valve coupling each zone line to the main water supply line (306), (307), (308) respectively, a solenoid coupled to each valve (316), (317), (318) respectively, a first programmable irrigation electronic processor (309), for individually controlling the solenoids. A backflow prevention valve (341), may also be employed.

The system of the present invention is also an irrigation/chemical injection system (300) and (400) for automatically irrigating individual zones and for automatically applying liquid additives or chemicals. The additives are chosen from the class of liquid chemicals including fertilizer chemicals and pest control chemicals to be fed to the individual zones. The irrigating and the applying of liquid chemicals are done in a safe, ecologically beneficial, convenient and economical manner. The irrigation/chemical injection system comprising, in combination, a main water supply line (302), having an input and an output. The input of the main water supply line is adapted to be coupled to a supply of water for irrigation.

Provided next to the system of the present invention is a plurality of separate zone lines (303), (304), (305). Such zone lines are operatively coupled to the output of the main water supply line.

A plurality of spray heads are next provided (303A), (304A), (305A). The plurality of spray heads are operatively coupled with respect to the zone lines (303), (304), (305).

Valves (306), (307), (308), operatively couple each zone line to the main water supply line. Each valve is adapted to be switched between an open orientation for permitting the passage of liquids there through and a closed orientation for precluding the passage of liquids there through.

Solenoids (316), (317), (318), are next provided. A solenoid is coupled to each valve. The solenoids function for switching the valves.

Also provided are a plurality of reservoirs (327), (328). The plurality of reservoirs include a first reservoir for pest control chemicals (327). The plurality of reservoirs include a second reservoir for fertilizer chemicals (328).

Chemical lines (321), (325), (326), are next provided. The chemical lines include a first chemical line (325), (321), coupling the first reservoir to the main water supply line. The chemical lines also include a second chemical line (326), (321), coupling the second reservoir to the main water supply line (302). The lines (325), (326), join together (322), a short distance from the main water supply line (302), and then run as one line (321), to the point where they connect into the main water supply line at junction (320). This will be down stream of the backflow prevention valve (341), if one is used.

Chemical pumps (323), (324), include a first pump (323), operatively coupled to the first reservoir (327), to feed chemicals from the first reservoir through the first chemical line (325), (321), to the main water supply line junction (320). The chemical pumps include a second pump (324), operatively coupled to the second reservoir (328), to feed chemicals from the second reservoir through the second chemical line (326), (321). Electrical cables (336), (337), connect pumps (323), (324), to second electronic circuit board (340).

A first programmable irrigation electronic processor (309), is provided for individually controlling the solenoids with the valves. The solenoids and the valves are for irrigation purposes.

Provided last is a second electronic circuit board (340) and programmable microprocessor (351), for individually controlling the pumps (323), (324), and for individually controlling the solenoids (316), (317), (318), with their valves (306), (307), (308), for chemical injection purposes.

The first programmable irrigation electronic processor (309), is coupled to the second electronic circuit board (340) which contains the programmable microprocessor (351). Control signals exit the first programmable irrigation electronic processor at (310), (311), (312), and then loop through the second electronic circuit board (340), at (310B), (311B), (312B) and finally connect to solenoids (316), (317), (318).

The common wire (313), that connects each of the zonal solenoid control valves (316), (317), (318), to the first programmable irrigation electronic processor (309), also connects through electrical cable (313A), to the second electronic circuit board (340), at (313B).

The wiring loops that pass through the second electronic circuit board (340), at (310B), (311B), (312B) are connected to one relay for each pair.

Figure 4:
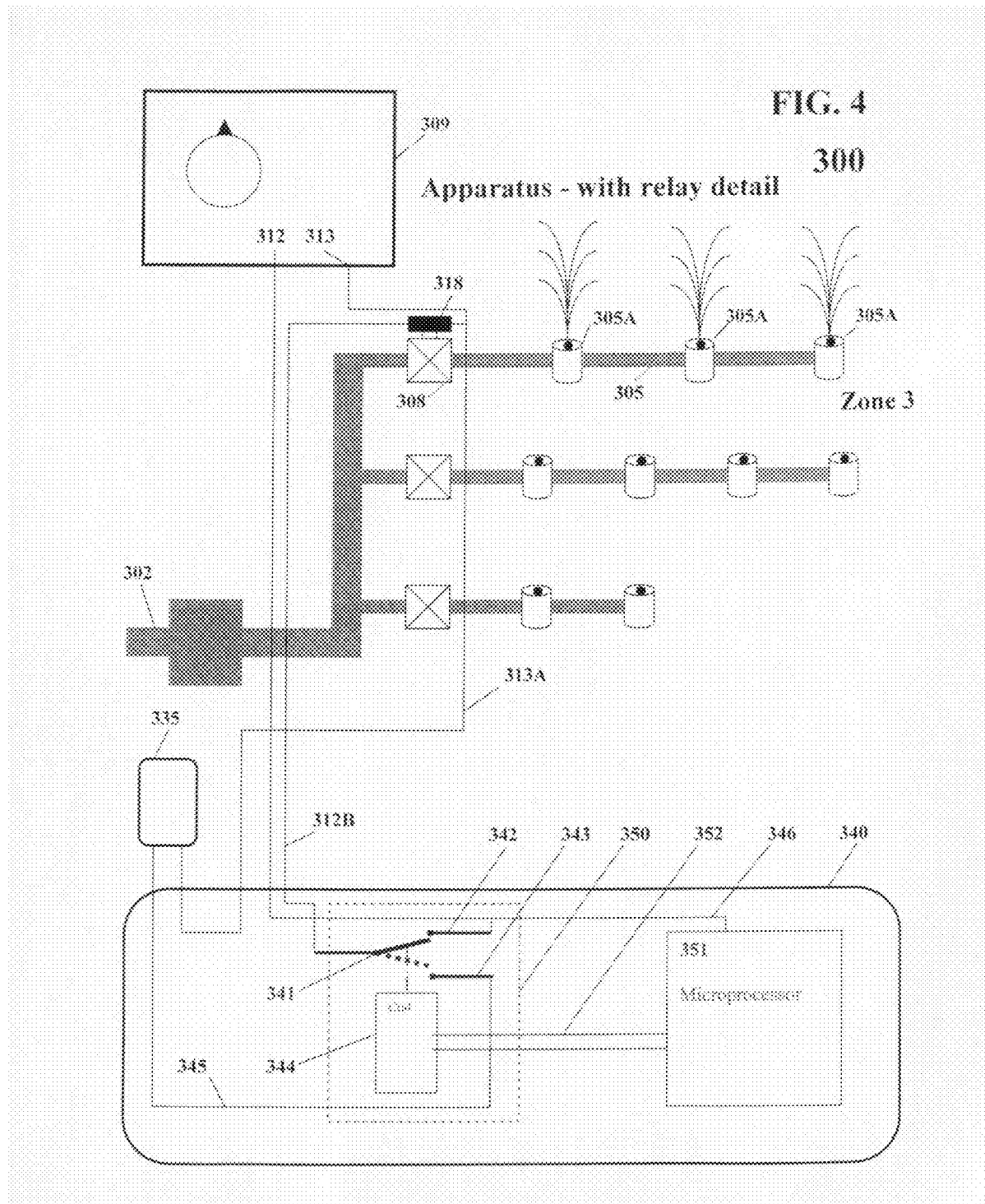
FIG. 4 is a schematic illustration of certain electrical details incorporating a preferred embodiment of this invention.

Now with reference to drawing, FIG. 4 thereof, relay (350), and connection thereof are shown for zone 3 but it is to be understood that there exists the same arrangement for each irrigation zone.

The electrical cable (312), coming from the first programmable irrigation electronic processor (309), connects to the normally closed contact (342) of relay (350). The cable (312B), that returns to the solenoid control valve (318), connects to the common contact (341). The normally open contact (343) of relay (350), is supplied with electricity at an appropriate voltage to operate the solenoid valve (318), by power supply (335). In the off position, the signal from the first programmable irrigation electronic processor (309), passes through the relay (350), and out to the solenoid control valve (318) allowing for normal operation of the irrigation system. The programmable microprocessor (351), is able to energize the relay (350), through electrical cables (352). When the relay (350), is energized, the common contact (341), moves to connect with (343).

Electricity is supplied from the power supply (335), to contact (343) through cable (345), and now flows through (312B) to energize solenoid control valve (318), independently of its normal control from the first programmable irrigation electronic processor (309). It is understood that solid state components could be used in place of the relays without changing the scope of the patent.

Figure 3:
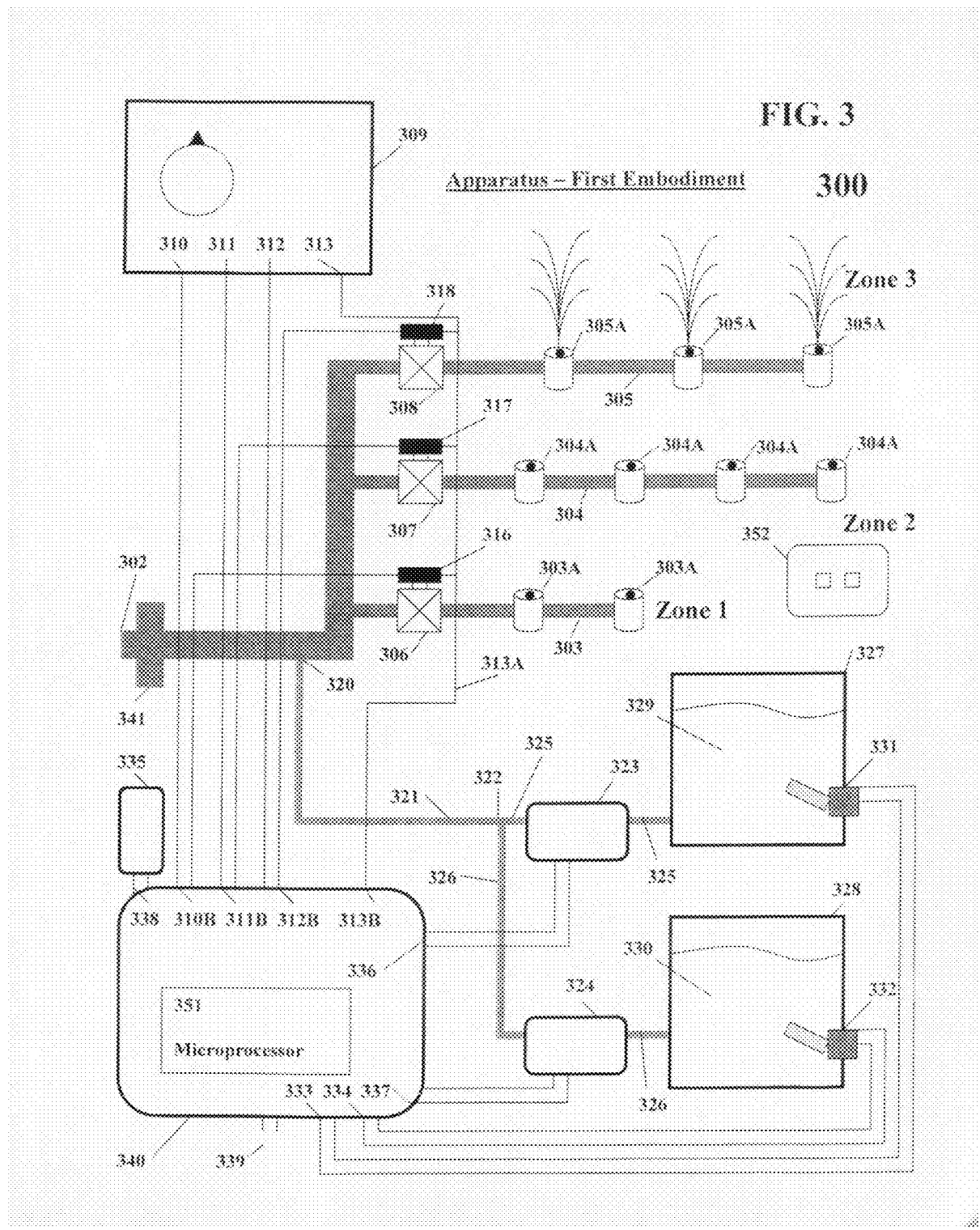
FIG. 3 is a schematic illustration of the system shown in FIG. 2 incorporating a preferred embodiment of this invention.

Now with reference to drawing, FIG. 3 thereof, concurrently with the process described above, one of the pumps (323), (324), are operated through electrical cables (336), (337), by programmable microprocessor (351). This causes chemical additive (329), (330), to be drawn from reservoirs (327), (328), through one of the pumps (323), (324), passing through supply lines (321), (325), (326), and then to be injected into the stream of irrigation water at (320). Additive is thus delivered to the plants/lawns by the respective zone also being activated through sprinkler heads (303A), (304A), (305A).

Through this type of wiring configuration it can be seen that the apparatus (300) and (400) is able to run complete chemigation treatments independent of the times that the first programmable irrigation electronic processor (309), is operating its irrigation cycles.

There is an additional relay provided in the second electronic circuit board (340), to operate a well pump if the irrigation system uses one. A pair of terminals (339), allows a well pump to be thus controlled by the apparatus.

There may be a wireless device (352) for operating the programmable microprocessor (351). This would usually be used to initiate an immediate additive injection cycle.

The apparatus is normally connected to a mains outlet using an outlet mounted transformer (335), connected through electrical cable (338), to the second electronic circuit board (340). The apparatus could be connected to mains voltage directly without altering the scope of the invention.

Now with reference to drawing, FIG. 4 thereof, a connection (346), exists from contact (342), into programmable microprocessor (351). This is shown for zone 3 but it is to be understood that there exists the same arrangement for each irrigation zone. This allows programmable microprocessor (351), to sense when a zone of the irrigation system is operational under the control of first programmable irrigation electronic processor (309), and to thus make decisions based upon this. This would normally mean that it would defer the application of certain chemicals until a period of time has elapsed after the irrigation cycle had ended. The main purpose is to allow the plants/lawns to dry off so that the chemicals being applied can adhere to the plants/lawns. This is just an example of the logic that could be employed with this feature but is not limited to the deferment of chemigation processes.

Controls

Figure 5:
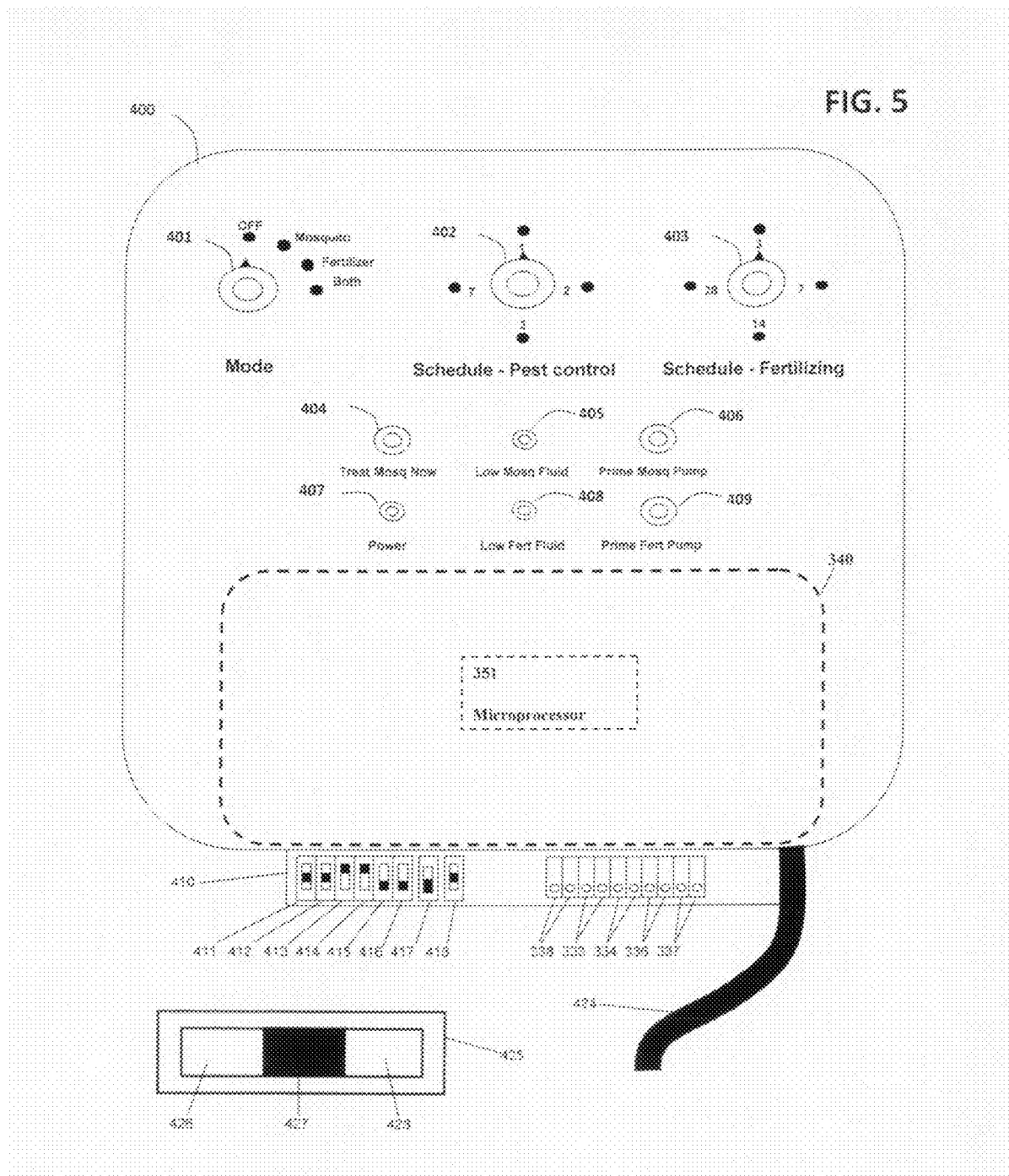
FIG. 5 is a schematic layout of the controls for programming the automated injection control system.

Now with reference to drawing, FIG. 5 thereof, the control enclosure (400) is shown which houses the second electronic circuit board (340) and programmable microprocessor (351) within. The various controls and electrical connections are shown and their corresponding reference number listed below to explain their purpose.

340—Second electronic circuit board
351—Programmable microprocessor
400—Control enclosure containing the microprocessor, relays, switches, etc.
401—Main operational mode selector switch, also the on/off switch
402—Schedule selector switch for pest concentrate application cycles
403—Schedule selector switch for fertilizer concentrate application cycles
404—Switch to immediately initiate a pest concentrate application cycle
405—LED that flashes if the for pest concentrate level is low
406—Switch to prime the pest concentrate pump and piping
407—LED that indicates that the unit is turned on
408—LED that flashes if the for fertilizer concentrate level is low
409—Switch to prime the fertilizer concentrate pump and piping
410—Area of the circuit board that protrudes from the control enclosure and houses dip switches and electrical connection points
411—Selector switch to configure irrigation zone #1
412—Selector switch to configure irrigation zone #2
413—Selector switch to configure irrigation zone #3
414—Selector switch to configure irrigation zone #4
415—Selector switch to configure irrigation zone #5
416—Selector switch to configure irrigation zone #6
417—Selector switch to turn on/off the Well Pump function: ON/OFF
418—Selector switch to select the treatment deferral delay mode: OFF/6 Hours/12 Hours
338—Connectors for the electrical cables connecting to power supply (335), as shown on FIG. 3
333—Connectors for the electrical cables connecting to float switch (331), as shown on FIG. 3
334—Connectors for the electrical cables connecting to float switch (332), as shown on FIG. 3
336—Connectors for the electrical cables connecting to pump (323), as shown on FIG. 3
337—Connectors for the electrical cables connecting to pump (324), as shown on FIG. 3
424—Multi strand electrical cable that connects apparatus to existing irrigation system electrical components/wiring.
425—Detail showing function of switches 411-417
426—The (0) position, which means (Zone=Not active)
427—The (1) position, which means (zone=active & zone size=small)
428—The (2) position, which means (zone=active & zone size=Large)

DESCRIPTION OF THE SECOND EMBODIMENT

Figure 6:
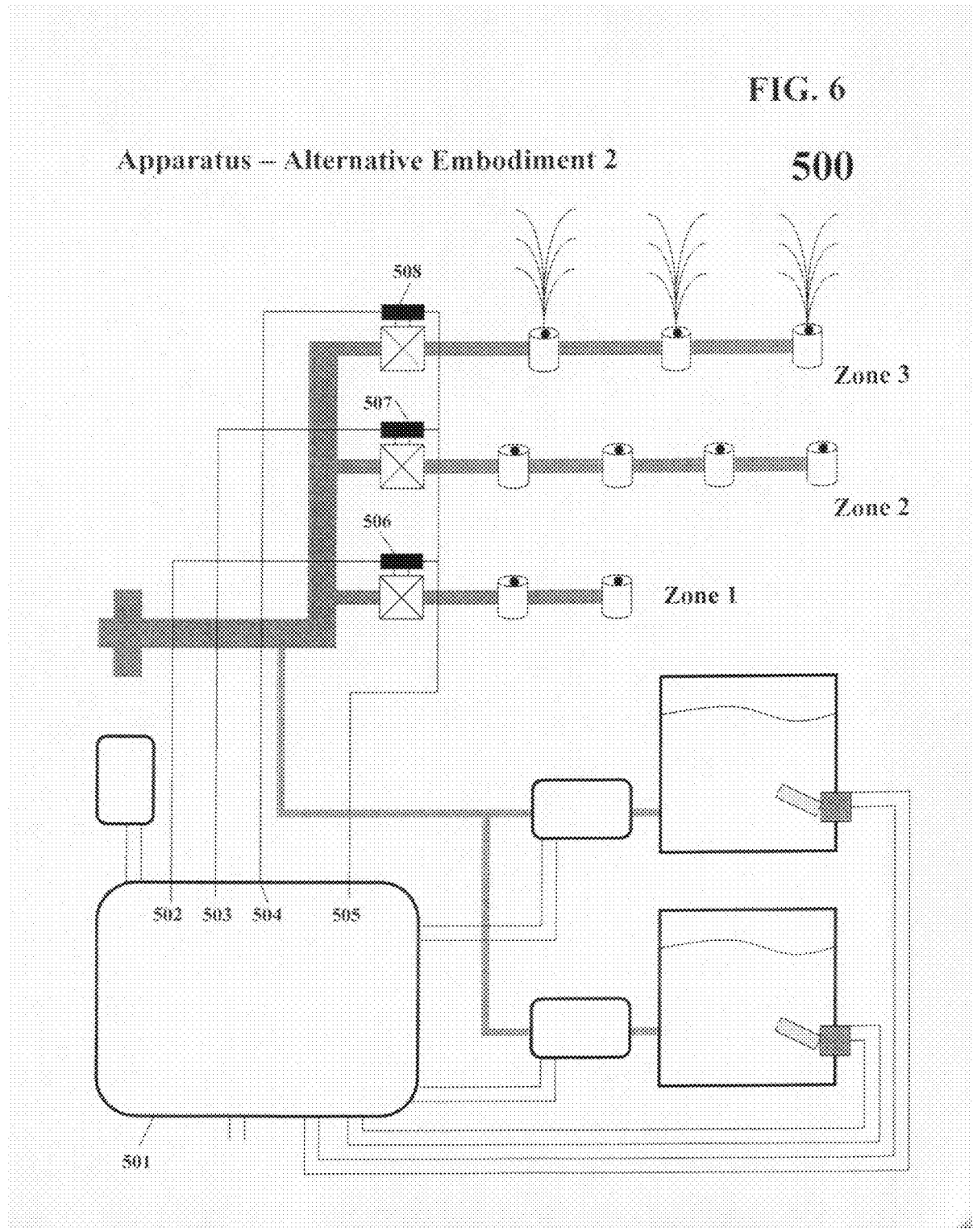
FIG. 6 is a schematic illustration of the system shown in FIG. 2 incorporating a second embodiment of this invention.

Now with reference to drawing, FIG. 6 thereof, an alternate embodiment of the invention includes apparatus (500) wherein the first and second electronic processors are integrated into a single processor (501). In this case the irrigation timer is not used at all.

The single processor (501) has electrical cable connections (502), (503), (504), that supply electricity to the zonal solenoid control valves (506), (507), (508), respectively. There is a common connection (505) running to all zonal solenoid control valves (506), (507), (508).

Figure 7:
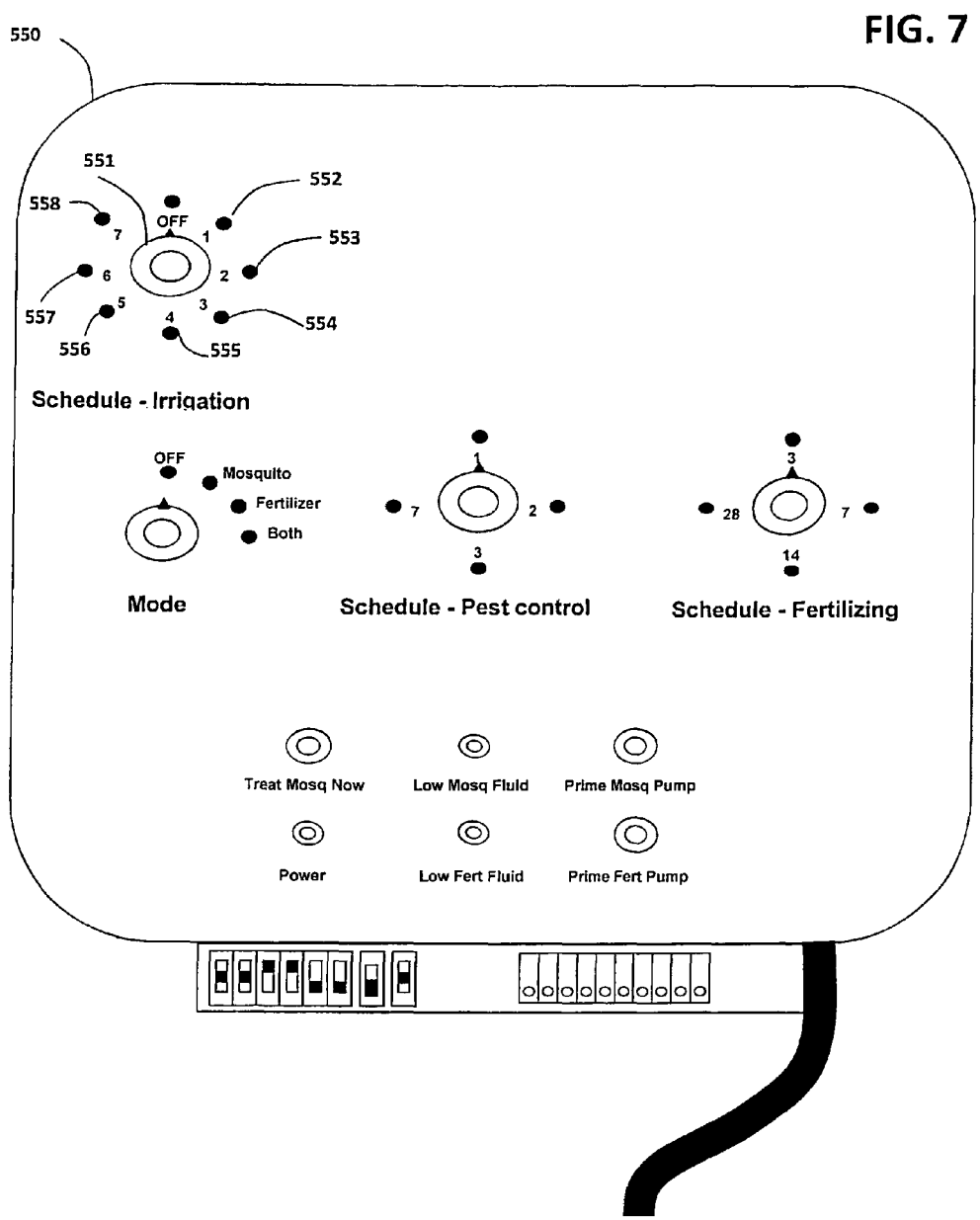
FIG. 7 is a schematic layout of the controls for programming the second embodiment of this invention.

Now with reference to drawing, FIG. 7 thereof, the control enclosure (550) is shown and an additional selector switch (551) is fitted. This enables the microprocessor as fitted to the first embodiment to have the additional functionality of acting as the irrigation controller as well as the chemigation controller by selecting one of the irrigation schedules (552), (553), (554), (555), (556), (557), (558).

DESCRIPTION OF THE THIRD EMBODIMENT

Figure 8:
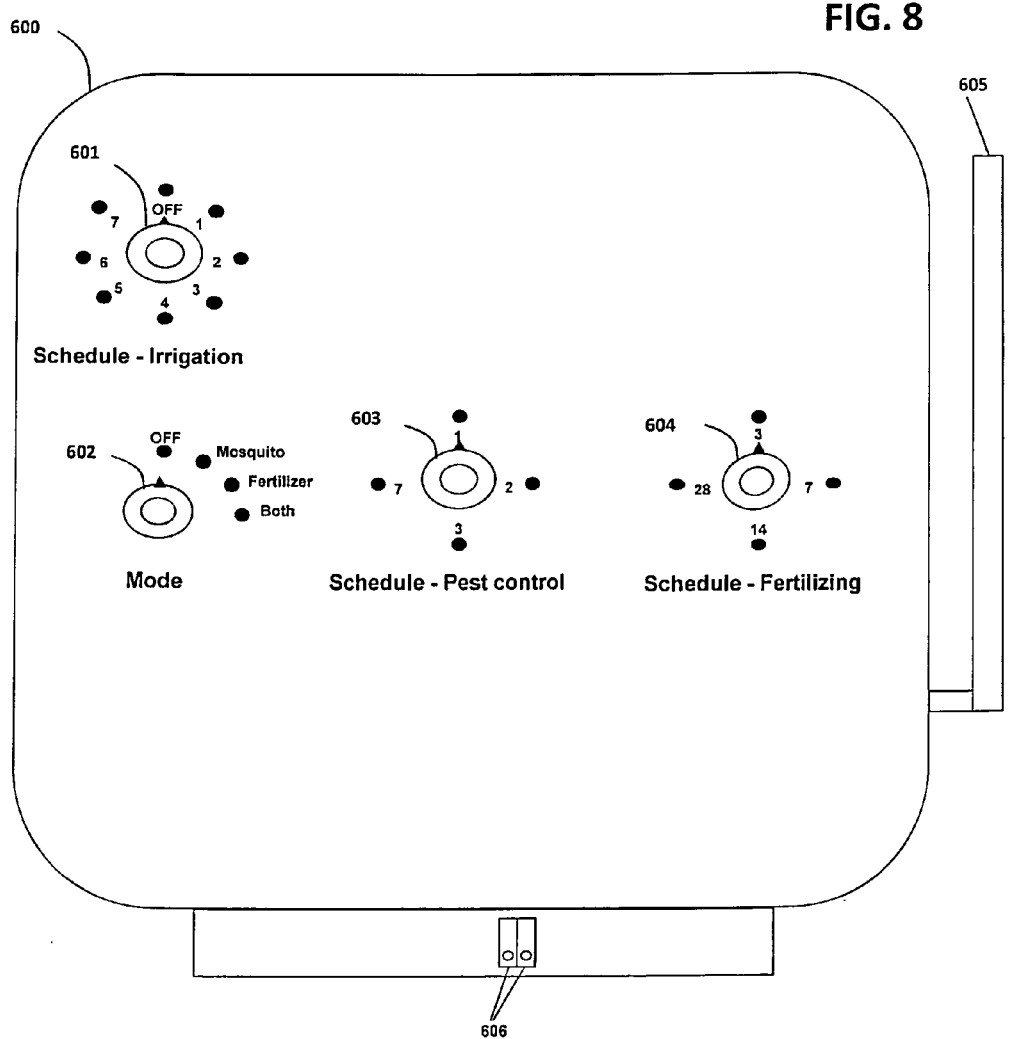
FIG. 8 is a schematic layout of the controls for the master controller of the third embodiment of this invention.
Figure 9:
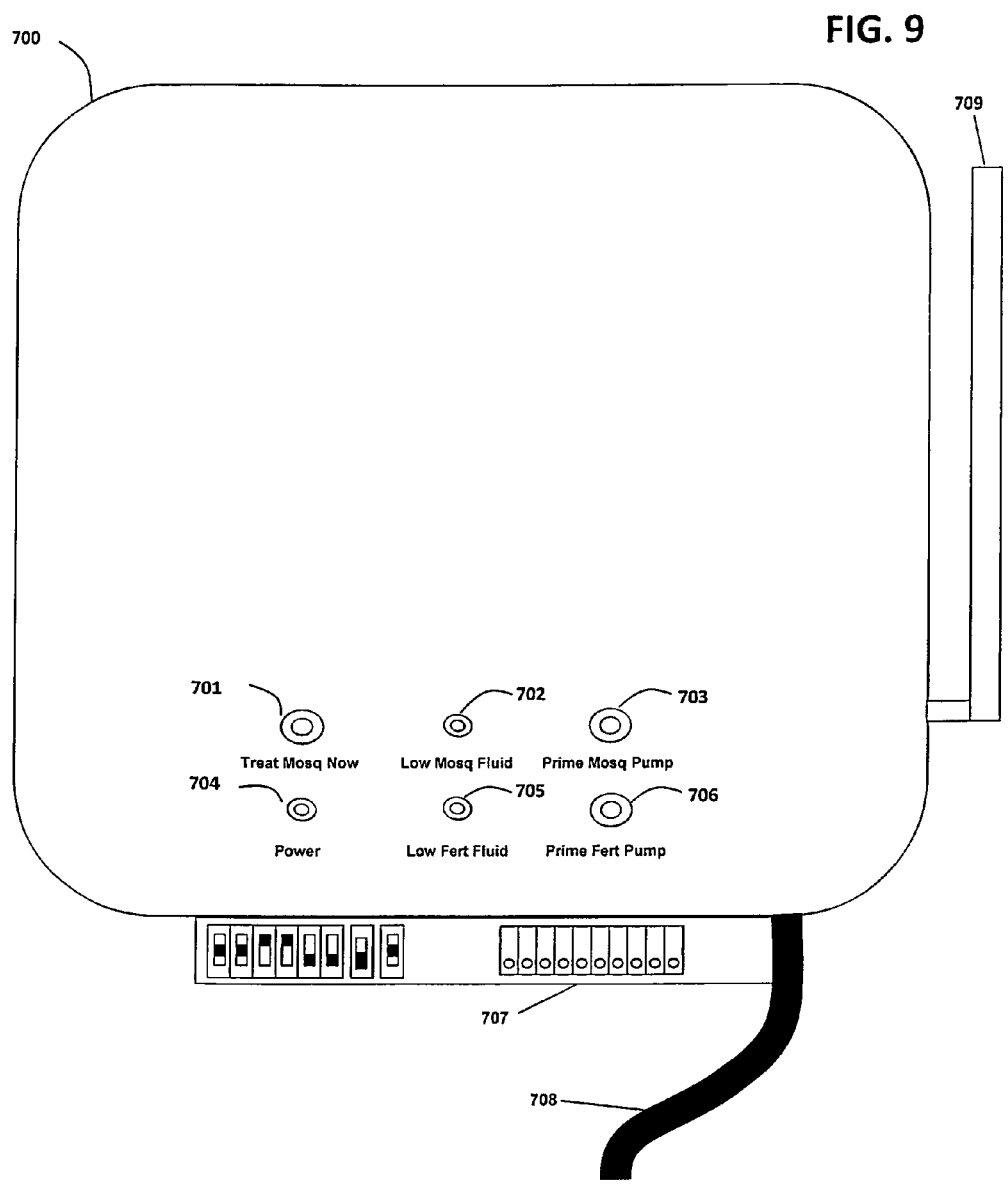
FIG. 9 is a schematic layout of the controls for the second electronic processor of the third embodiment of this invention.

Now with reference to drawing, FIG. 8 thereof, the final alternate embodiment of the invention includes having a master controller (600), and with reference to drawing, FIG. 9 thereof, a plurality of second electronic processors (700) individually controlled by the master controller.

Each second electronic processor (700), is electrically connected to one irrigation system in the same configuration as the first embodiment.

By employing this configuration, the apparatus can be employed in large areas such as hotel/resorts etc that have many individual irrigation systems and still have the chemigation and optionally irrigation, controlled by one central point.

FIG. 8 shows master controller (600), whereby the user can select the application times/dates in a similar configuration to that of the first embodiment using switches (602), (603), (604). It also act as the irrigation timer as in the second embodiment by selecting a schedule on selector switch (601).

Instead of being directly connected to the irrigation system, master controller (600), sends out wireless signals through an antenna (605), to a multiple of slave units. The only direct electrical connection to this unit is the power supply (606), which can be low voltage (24 volt A/C) or any other desired voltage.

FIG. 9 shows one of a multiple of control enclosures containing the second electronic circuit board, microprocessor, relays, and switches (700). This receives a wireless signal from the master unit (600), through antenna (709).

Certain controls remain on the second electronic processor (700). These are for the pump priming (703), (706), and diagnostic LED'S (704), (702), (705). A switch to immediately initiate an application cycle (701) may be provided also. In this alternate embodiment of the invention, the individual solenoids are individually programmed and the individual pumps are individually programmed.

In all embodiments of this invention, this system takes control of the irrigation system and runs it by controlling the irrigation zone solenoids and simultaneously running injection pumps.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Chemical injection apparatus for use with an irrigation assembly of the type having a main water supply line with a plurality of zone lines, the zone lines having spray heads, a valve coupling each zone line to the main water supply line, a solenoid coupled to each valve, a first electronic processor for individually controlling the solenoids, the chemical injection apparatus comprising:
   - a plurality of reservoirs for fertilizer chemicals and pest control chemicals;
   - chemical lines coupling the reservoirs to the main water supply line;
   - a chemical pump for each reservoir to feed chemicals from the reservoirs to the main water supply line; and
   - a second electronic circuit board and programmable microprocessor for individually controlling the chemical pumps and for individually controlling the solenoids with their valves for chemical injection purposes, the first programmable irrigation electronic processor being coupled to the second electronic circuit board, whereby control signals from the first programmable irrigation electronic processor pass through the second electronic circuit board and then connect to the irrigation solenoids, the apparatus takes control of the irrigation system and runs it by controlling the irrigation zonal solenoids and simultaneously running chemical pumps.

2. The apparatus as set forth in claim 1 wherein the individual solenoids are individually programmed and wherein the individual pumps are individually programmed.

3. The apparatus (300) and (400) as set forth in claim 1 and further including a wireless device (352) for operating the irrigation zonal solenoids and chemical pumps.

4. The apparatus (500) as set forth in claim 1 wherein the first and second electronic processors are integrated into a single processor (501).

5. The apparatus as set forth in claim 1 and further including a master controller (600) and a plurality of second electronic processors (700) individually controlled by the master controller.

6. An irrigation/chemical injection system (300) and (400) for automatically irrigating individual zones and for automatically applying liquid chemicals chosen from the class of liquid chemicals including fertilizer chemicals and pest control chemicals to the individual zones, the irrigating and the applying of liquid chemicals being done in a safe, ecologically beneficial, convenient and economical manner, the irrigation/chemical injection system comprising, in combination:
   - a main water supply line (302) having an input and an output, the input of the main water supply line adapted to be coupled to a supply of water for irrigation;
   - a plurality of separate zone lines (303, 304, 305) operatively coupled to the output of the main water supply line;
   - a plurality of spray heads (303A, 304B, 304C) operatively coupled to the zone lines;
   - a valve (306, 307, 308) operatively coupling each zone line to the main water supply line, each valve adapted to be switched between an open orientation for permitting the passage of chemicals and a closed orientation for precluding the passage of chemicals;
   - a solenoid (316, 317, 318) operative coupled to each valve for switching the valves;
   - a plurality of reservoirs (327, 328) including a first reservoir for fertilizer chemicals and a second reservoir of pest control chemicals;
   - chemical lines (321, 325, 326) including a first chemical line coupling the first reservoir to the main water supply line and a second chemical line coupling the second reservoir to the main water supply line;
   - chemical pumps (323, 324) including a first pump operatively coupled to the first reservoir to feed chemicals from the first reservoir through the first chemical line to the main water supply line and a second pump operatively coupled to the second reservoir to feed chemicals from the second reservoir through the second chemical line to the main water supply line;
   - a first programmable irrigation electronic processor (309) for individually controlling the solenoids with the valves for irrigation purposes; and
   - a second electronic circuit board (340) and programmable microprocessor (351) for individually controlling the pumps and for individually controlling the solenoids with their valves for chemical injection purposes, the first programmable irrigation electronic processor (309) being coupled to the second electronic circuit board (340), whereby control signals from the first programmable irrigation electronic processor (309) pass through the second electronic circuit board (340) and then connect to the irrigation solenoids, the apparatus takes control of the irrigation system and runs it by controlling the irrigation zonal solenoids and simultaneously running chemical injection pumps.

* * * * *